(12) United States Patent
Miyasaka

(10) Patent No.: US 7,431,960 B2
(45) Date of Patent: Oct. 7, 2008

(54) PHOTOCATALYST COATING METHOD AND PHOTOCATALYST COATED ARTICLE PRODUCED BY SUCH METHOD

(75) Inventor: Yoshio Miyasaka, Nagoya (JP)

(73) Assignee: Fuji Kihan Co., Ltd., Aichi (JP)

( * ) Notice: Subject to any disclaimer, the term of this patent is extended or adjusted under 35 U.S.C. 154(b) by 242 days.

(21) Appl. No.: 10/554,333

(22) PCT Filed: Apr. 23, 2004

(86) PCT No.: PCT/JP2004/005896

§ 371 (c)(1),
(2), (4) Date: Oct. 24, 2005

(87) PCT Pub. No.: WO2004/098791

PCT Pub. Date: Nov. 18, 2004

(65) Prior Publication Data

US 2006/0246223 A1 Nov. 2, 2006

(30) Foreign Application Priority Data

May 6, 2003 (JP) ............................. 2003-128304

(51) Int. Cl.
*B05D 1/06* (2006.01)
*B05D 3/10* (2006.01)

(52) U.S. Cl. .................. 427/126.3; 427/201; 427/421.1
(58) Field of Classification Search ....................... None
See application file for complete search history.

(56) References Cited

FOREIGN PATENT DOCUMENTS

| JP | 2000-61314 | | 2/2000 |
|---|---|---|---|
| JP | 2000-061314 | * | 2/2000 |
| JP | 3379913 | | 12/2002 |
| JP | 2003-278246 | | 10/2003 |

OTHER PUBLICATIONS

"High-velocity Particle consolidation Technology", M.F. Amateau et al, IMAST Quarterly, 2000, pp. 3-6.*

* cited by examiner

*Primary Examiner*—Frederick J Parker
(74) *Attorney, Agent, or Firm*—Merchant & Gould P.C.

(57) ABSTRACT

Occurrence of a powder dust explosion is prevented in a photocatalyst coating method of forming a titania layer by injection of titanium powder. Powder of titanium or titanium alloy is injected on a surface of a product to be treated composed of metallic product, ceramic, or mixture thereof, with compressed gas having inert gas as a principal component containing oxygen from 0 to 15% by mass, and the titanium in the powder of titanium or titanium alloy is diffused and oxidized on the surface of the product to be treated to form a titania layer.

7 Claims, No Drawings

PHOTOCATALYST COATING METHOD AND PHOTOCATALYST COATED ARTICLE PRODUCED BY SUCH METHOD

TECHNICAL FIELD

The present invention relates to a method of coating titania (TiO$_2$) that is a photocatalyst having a decomposition effect such as deodorizing, antibacterial and contamination control, and hydrophilia performance and more specifically, in a photocatalyst coating method, in which a titania layer is formed by injecting powder of titanium or a titanium alloy (referred to as titanium powder hereinafter) on a surface of a product to be treated composed of metal, ceramic, or mixture thereof, relates to such a photocatalyst coating method that a risk of fire or powder dust explosion caused by the titanium powder is reduced or eliminated.

BACKGROUND ART

A photocatalyst made of titania (TiO$_2$) as the principal component having an excellent decomposition effect and hydrophilia performance has been conventionally used in many fields.

The aforementioned decomposition of the titania is made in such a way that electrons and positive holes are generated on a titanium surface by irradiating ultraviolet light contained in sunlight or a fluorescent lamp on the titanium, and the electrons reduce oxygen in air, thereby changing the oxygen into superoxide ions (O$_2^-$) and the positive holes oxidize water components adhered to the titanium surface, thereby changing the water components into hydroxyl radicals (OH), and these superoxide ions and hydroxyl radicals oxidize and decompose organic compounds such as contaminants on the titania surface.

As a method of thus forming a titania layer having a decomposition effect and hydrophilia, there is, as shown in Japanese Patent KOKAI (LOPI) No. 12-61314 (page 3 to page 5), a method of forming a titania layer on a surface of a product to be treated by injecting titanium powder on the surface of the product to be treated by way of a blast method.

Note that Japanese Patent KOKAI (LOPI) No. 12-61314 has disclosed no detailed description of what compressed gas is used to inject the titanium powder, but injection of injection powder by a blast method is generally performed by compressed air.

In addition, with regard to use of other compressed gas rather than the compressed air for injection of injection powder by a blast method, there is a injection method of injection powder, as disclosed in Japanese Patent No. 3379913 (page 1 to page 5), by use of a nitrogen gas generated by liquid nitrogen. This method, however, does not have an object of coating a photocatalyst, but the nitrogen gas is used for the purpose of cooling and nitriding the surface of a work piece.

DISCLOSURE OF THE INVENTION

Problems to be Solved by the Invention

There is known possible occurrence of fires or explosions caused by ignition of powder (hereinafter, referred to as "powder dust explosion" for a general term of these fires and explosions), and an attention is paid so that such powder dust explosion does not occur in the field where the powder is handled.

This powder dust explosion occurs also in powder dusts of an agricultural processing product such as powder, chemical synthesis powder dusts of plastic powder or the like, powder dusts of chemical agents, and powder of metal, and in addition, metal powder having units of μm, such as aluminum, aluminum light alloy, magnesium, titanium or the like are known as metals with powder explosion risk.

And such powder dust explosion occurs when three conditions are completed, that is, "under an atmosphere containing oxygen", "powder dusts are produced more than an explosion lower limit density", and "minimum ignition energies are provided".

Concerning such occurrence conditions of the powder dust explosion, in a photocatalyst coating method by a blast method disclosed in Japanese Patent KOKAI (LOPI) No. 12-61314, a formation mechanism of a titania layer is considered to be realized in such a way that titanium powder (a particle diameter is from 10 to 800 μm), which is listed as metals with the powder dust explosion risk, is injected at a high speed and hence the temperature of the titanium powder as well as the surface of a workpiece is raised by energy of the titanium powder collided with the surface of the workpiece, and then the titanium powder is heated by the surface of the product to be treated and the titanium in the titanium powder is activation-adsorbed and diffused on the surface of the product to be treated, and performs an oxidative reaction with oxygen in the air, thus forming a titania layer.

Consequently, the photocatalyst coating method described above requires that "the titanium powder" is "injected under the atmosphere containing oxygen" to get "heated" and "oxidized" in order to obtain a photocatalyst coating, which shows that processes are performed under conditions with the risk of powder dust explosion when collating with the occurrence conditions of the powder dust explosion.

Such a powder dust explosion has the following general tendencies since it occurs due to rapid oxidation of the powder.

As for a tendency of powder properties, the tendencies are:
the easier reaction with oxygen, the easier explosion;
the smaller particle diameter, the easier explosion;
the larger specific surface area of the powder, the easier explosion; and as for a tendency of a surrounding atmosphere, the tendency is:
the higher density of oxygen, the easier explosion.

Therefore, in order to control the occurrence of the powder dust explosion, it is conceivable to prepare conditions for the powder to be hardly oxidized in such ways that to make the powder more difficult to react with the oxygen, to make the particle diameter be larger, to make the exposed surface area be smaller, or further, to make the oxygen density of the surrounding atmosphere be lower.

However, in order to form a titania layer by injecting the titanium powder on the surface of the product to be treated, forming titania through oxidization of titanium is a required condition as described above. Therefore, to prepare conditions so that the titanium powder is hardly oxidized results in per se restricting formation of the titania layer. Thus it has been thought that it is difficult to achieve both requirements, that is, restriction of the powder dust explosion and an efficient formation of the titania layer through condition preparation with regard to the powder and the surrounding atmosphere.

Accordingly, in order to restrict the powder dust explosion in the photocatalyst coating method, the titanium powder and the compressed air for injecting the titanium powder are not controlled but instead a blast processing apparatus with an anti-explosion specification is used, such as an anti-static structure not to satisfy a condition of "provision of minimum required igniting energy", anti-explosive type motor, provision of other devices and a structure preventing to generate more powder dusts than the lowest explosion density.

However, such blast processing apparatus as with this type of anti-explosion specification is extremely expensive and a huge expense is forced to be spent in equipment investment or the like.

Means to Solve the Problems

Accordingly, the present invention has been made for solving the foregoing problems and has an object of providing a photocatalyst coating method, which can prevent occurrence of a powder dust explosion without use of a blast processing apparatus with an anti-explosion specification in a photocatalyst coating method of forming a titania layer on a surface of a work piece by injection of titanium powder.

Another object of the present invention is to provide a photocatalyst coating method, which can efficiently perform formation of a titania layer even in a state where a risk of occurrence of the powder dust explosion is reduced.

The Invention

In order to achieve the objects, in a photocatalyst coating method and a photocatalyst coated product according to the present invention, powder of metal or metal alloy containing the metal having photocatalyst performance by oxidation of titanium or a titanium alloy and the like is injected on a surface of a product to be treated composed of metallic product, ceramic, or mixture thereof, with a compressed gas having inert gas as a principal component containing oxygen from 0 to 15% by mass, and the titanium in the powder formed of the titanium or the titanium alloy is diffused as well as oxidized on the surface of the product to be treated, and forming a titania layer thereon.

EMBODIMENTS OF THE INVENTION

The powder includes aluminum, aluminum light alloy, magnesium and alloy thereof, which have low photo catalytic performance, though.

In the photocatalyst coating method and the photocatalyst coated product, the injection of powder of the titanium or the titanium alloy may be performed at an injection speed of 80 m/sec or more or at an injection pressure of 0.29 MPa or more.

Further, it is preferable that the powder of the titanium or the titanium alloy has an average particle diameter of 10 to 800 μm where the content of oxygen in the compressed gas is reduced corresponding to reduction of the particle diameter of the powder of the titanium or the titanium alloy to be injected, and also the content of oxygen in the compressed gas is increased corresponding to increase of the particle diameter of the powder of the titanium or the titanium alloy.

In case of using the powder of the titanium or the titanium alloy having an average particle diameter of 20 to 45 μm, the content of oxygen in the compressed gas may be in the range of 0 to 10% by mass, preferably 5% by mass.

In case of using the powder of the titanium or the titanium alloy having an average particle diameter of 300 μm or more taking into account grids thereof, it is preferable that the content of oxygen in the compressed gas is in the range of 10 to 15% by mass.

Effect of the Invention

According to the arrangement of the present invention as explained so far, it has been accomplished to provide a photocatalyst coating method, which can prevent occurrence of a powder dust explosion without use of a blast processing apparatus with an anti-explosion specification in a photocatalyst coating method of forming a titania layer on the surface of a work piece by injection of titanium powder.

In particular, through the arrangement of appropriately adjusting the particle diameter of the titanium powder and the content of oxygen in the compressed gas used for injecting the titanium powder, it has been accomplished to provide a photocatalyst coating method, which can efficiently perform formation of a titania layer even in a state where a risk of occurrence of the powder dust explosion is reduced as described above.

PREFERRED EMBODIMENT OF THE INVENTION

Next, embodiments of the present invention will be explained hereinafter.

A photocatalyst coating method of the present invention has the same basic arrangement as the photocatalyst coating method in Japanese Patent KOKAI (LOPI) No. 12-61314 described in the prior art, and injects titanium powder having a particle diameter of 10 to 800 μm at an injection speed of 80 m/s or more or at an injection pressure of 0.29 MPa or more on the surface of an product to be treated composed of metal, ceramic or mixture thereof to collide with the surface of the product to be treated, and thus a titania layer is formed.

However, in the photocatalyst coating method described in Japanese Patent KOKAI (LOPI) No. 12-61314, the injection of the titanium powder is performed by the compressed air, and on the other hand, according to the present invention, performed by the compressed gas having inert gas as a principal component containing oxygen of 0 to 15% by mass, preferably 5 to 15% by mass.

Note that the inert gas indicates such gas as nitrogen gas or carbon dioxide having poorer reactivity as compared to oxygen gas. In the present embodiment, compressed gas containing oxygen with the described percentage by mass is obtained by introducing into a compressor, for example, air (nitrogen 78% oxygen 21%, argon 0.9%, others 0.1%) and gas such as nitrogen gas or carbon dioxide supplied from a cylinder or the like.

In addition, a small extent of nitriding is performed by use of nitrogen gas, thereby enabling an improvement of a photocatalytic effect.

In a case where the content of oxygen in the compressed gas in use is to be less than 5%, it is possible to perform photocatalyst coating if the particle diameter of titanium powder is relatively small.

In addition, when the content of oxygen exceeds 15%, the powder dust explosion is more likely to occur. Therefore, the upper limit of the content of oxygen in the compressed gas is settled to be 15%.

As for titanium powder, it is possible to use the one having particle diameter of 10 to 800 μm, preferably approximately 20 to 300 μm, which can form a titania layer by the compressed gas injection.

The relationship between the particle diameter of titanium powder and formation performance of titania layer, according to experiments by the inventor of the present invention, appears that as the particle diameter gets smaller, formation efficiency of the titania layer relative to an injection amount (injection time) is improved, and on the contrary, as the particle diameter gets larger, the formation efficiency of the titania layer deteriorates.

Also as for the relationship between the content of oxygen in the compressed gas for injecting the titanium powder and formation efficiency of the titania layer, it is resulted that as the content of oxygen is increased, the formation performance of the titania layer is improved, and as the content of oxygen is reduced, the formation of the titania layer deteriorates.

Meanwhile, as the particle diameter of the titanium powder to be used is smaller, the powder dust explosion is more likely to occur, and as the particle diameter is larger, the powder dust explosion is less likely to occur.

Taking into account such relationship as described above, in a photocatalyst coating method of the present invention, when the particle diameter of titanium powder to be used is relatively small, the content of oxygen in the compressed gas used for the titanium powder injection is to be reduced, and when the particle diameter of the titanium powder to be used is relatively large, the content of oxygen in the titanium powder used for the titanium powder injection is to be increased.

According to such combination of the particle diameter of the titanium powder and the content of oxygen in the compressed gas, when using the titanium powder of small particle diameter that has good formation performance of the titania layer, even if the compressed gas having smaller content of oxygen is used, remarkable deterioration of the formation efficiency of the titania layer is prevented, further, the possibility of the powder dust explosion can be reduced by use of the compressed gas having a small content of oxygen.

On the contrary, when the titanium powder having large particle diameter is used, formation performance of the titania layer deteriorates, but in order to compensate this, increased content of oxygen in the compressed gas to be used can prevent deterioration of formation performance of the titania layer accompanied with increased particle diameter of the titanium powder, and at the same time using the compressed gas having an increased content of oxygen for the titanium powder with larger particle diameter can also restrict the powder dust explosion.

In particular, since formation performance of the titania layer is extremely good in the range of 20 to 45 μm of the titanium powder particle diameter, the content of oxygen in the compressed gas used for this injection is set at the lower limit of the content of oxygen, which was described before, namely minimum risk of powder dust explosion, 0 to 10% by mass, preferably 5% by mass for the injection. Even when the injection of the titanium powder is performed with the oxygen content within the lower limit region, remarkable deterioration of formation performance of the titania layer is not found.

In addition, in case where the particle diameter of the titanium powder is equal to or more than 300 μm, when the titanium powder is injected with the compressed gas having the same content of oxygen, the formation efficiency of the titania layer is reduced to ⅓ to ⅕, as compared to the titanium powder having a particle diameter of 20 to 45 μm. Risk of the powder dust explosion is reduced when the particle diameter is equal to or more than 300 μm, therefore, the content of oxygen in the compressed gas used for this injection in the titanium powder having this particle diameter is set at the upper limit content of oxygen described above, namely, 10 to 15% by mass with which the titania layer can be formed most efficiently.

Note that, when the particle diameter is less than 20 μm, the titanium powder is sucked in the dust collector of the blast apparatus.

As described above, when a particle diameter (r) of the titanium powder is 45 (μm)<r<300 (μm), the oxygen density of the compressed gas is 5%<r<15%.

Thus a photocatalyst coating method of the present invention as described so far can provide such a photocatalyst coating method that can reduce the risk of powder dust explosion by injecting titanium powder with a compressed gas in which the content of oxygen is lowered with respect to compressed air, and at the same time that can reduce the risk of the powder dust explosion as low as possible without remarkable deterioration of titania layer formation performance by properly combining a particle diameter of the titanium powder and a content of oxygen in the compressed gas used for injection of the titanium powder.

Note that the relation between particle diameter of the titanium powder and the content of oxygen in the compressed gas used for injecting the titanium powder can be confirmed by the following test examples as well.

TEST EXAMPLE (1) Test Example 1

[Confirmation of Spark Occurrence State Change Corresponding to Variations of the Content of Oxygen and the Kind of the Titanium Powder]

The content (% by mass) of oxygen in the compressed gas for injecting the titanium powder was varied, and sizes of the spark generated when the titanium powder collided with the workpiece with various contents of oxygen were observed.

In addition, this comparison was carried out for plural kinds of the titanium powder.

Results are shown in Table 1. Note that other injection conditions at this time are shown in Table 2.

TABLE 1

|  | Compressed Gas | Injection Powder | Occurrence State of Spark |
| --- | --- | --- | --- |
| Embodiment 1 | Air + Nitrogen (oxygen approximately 5%) | Titanium Hydride (grid) 45 μm (#325) | Spark - large Risky |
| Embodiment 2 | Nitrogen (99.9%) (oxygen approximately 0%) | Powder Titanium (grid) 45 μm (#325) | Spark - extremely small No risk |
| Embodiment 3 | Air + Nitrogen (oxygen approximately 5%) | Powder Titanium (grid) 45 μm (#325) | Spark - small Continuous injection for 10 min with no risk |
| Embodiment 4 | Air + Nitrogen (oxygen approximately 10%) | Powder Titanium (grid) 45 μm (#325) | Spark - middle Slightly risky |
| Embodiment 5 | Air + Nitrogen (oxygen approximately 15%) | TILOP *1 (spherical) 150 μm (#100) | Spark - extremely small No risk |
| Comparative Example 1 | Compressed Air (oxygen 21%) | Titanium Hydride (grid) 45 μm (#325) | Spark - extremely large Extremely risky Experiment was stopped after several seconds |
| Comparative Example 2 | Compressed Air (oxygen 21%) | Powder Titanium (grid) 45 μm (#325) | Spark - large Risky |
| Comparative Example 3 | Compressed Air (oxygen 21%) | TILOP (spherical) 150 μm (#100) | Spark - middle A little risky |

*1 TILOP(Titanium Low Oxygen Powder)

TABLE 2

| | Test condition |
|---|---|
| Blast Apparatus | Gravity type blast apparatus |
| Product to be treated | Ceramic plate ($Al_2O_3$ not less than 99%) |
| Injection Pressure | 0.6 Mpa |
| Injection Nozzle Diameter | 9 mm in diameter |
| Injection Distance | 100 mm |

From the above results, when the injection was made using the compressed air (oxygen amount of 21%) as the "comparative examples", it was confirmed that there was a risk of occurrence of the powder dust explosion not only in the case of using the titanium powder having a particle diameter of 45 μm (#325) (comparative example 1 and comparative example 2), but also in the case of using the titanium powder having a particle diameter of 150 μm (#100) (comparative example 3).

It was confirmed that in the "embodiments" where the content of oxygen was equal to or less than 15%, except the case using the special titanium powder like titanium hydride powder (embodiment 1), if the particle diameter of the titanium powder was equal to or more than 150 μm (#100), a safe processing could be performed with the content of oxygen equal to or less than 15% (embodiment 5), and even when the particle diameter was 45 μm (#325), if the content of oxygen in the compressed gas was equal to or less than 5%, a safe processing can be performed (embodiment 2 and embodiment 3).

(2) Test Example 2

[Confirmation of Layer Formation State Change Accompanied with the Variations of the Content of Oxygen and the Titanium Powder]

The content of oxygen in the compressed gas for injecting the titanium powder was varied and formation state change of a layer formed on a work piece accompanied with the variations was confirmed.

In addition, this comparison was carried out for plural kinds of the titanium powder.

The results are shown in Table 3, and injection conditions at this time are shown in Table 4.

TABLE 3

| | Compressed Gas | Process Time | Injection Powder | Formation state of layer or others |
|---|---|---|---|---|
| Embodiment 6 | Air + Nitrogen (oxygen Approximately 5%) | 20 min | Powder Titanium (grid) 45 μm (#325) | Coating was evenly made. Generated spark was not in a risky level. |
| Embodiment 7 | Nitrogen (99.9%) (oxygen Approximately 0%) | 20 min | Powder Titanium (grid) 45 μm (#325) | Coating with light color was made. No change in color even with double process time. Generated spark was not in a risky level. |
| Embodiment 8 | Air + Nitrogen (oxygen Approximately 15%) | 30 min | TILOP (spherical) 150 μm (#100) | Coating was evenly made. Generated spark was not in a risky level. No deterioration of process capability was observed. |
| Embodiment 9 | Air + Nitrogen (oxygen Approximately 15%) | 90 min | Powder Titanium (grid) 300 μm (#54) | Coating was evenly made. Generated spark was not in a risky level. Deterioration of process capability with increase of particle diameter was observed. |

TABLE 4

| | Test condition |
|---|---|
| Blast Apparatus | Gravity type blast apparatus |
| Product to be treated | Ceramic ball φ6 mm ($Al_2O_3$ 93%) |
| Injection Pressure | 0.6 Mpa |
| Injection Nozzle Diameter | Diameter of 9 mm |
| Injection Distance | 200 mm |
| Treatment Amount | 10 kg in barrel |

From the above results, it was confirmed that if the particle diameter of the titanium powder was equal to or less than 45 μm (#325), even when the content of oxygen in the compressed gas was equal to or less than 5%, the titania layer could be formed in a relatively short process time of equal to or less than 20 min (embodiment 6 and embodiment 7).

In addition, it was confirmed that, even if the particle diameter of the titanium powder was 150 μm (#100), which was approximately 3.3 times as large as the particle diameter of 45 μm as in the embodiment 6 and the embodiment 7, the process time increase could be controlled to be in a small range of approximately 1.5 times by increasing the content of oxygen in the compressed gas to 15% (embodiment 8).

Thus the increase of the process time can be controlled by increasing the oxygen content in the compressed gas, which is assumed from the result of the embodiment 9 that when the injection powder having particle diameter twice as large as that of the embodiment 8 was used, formation performance of the titania layer was deteriorated and the injection time was increased by three times.

As the particle diameter of injection powder thus gets smaller, formation performance of a titania layer is improved, and on the contrary, as the particle diameter gets larger, the titania layer is hard to be formed.

Meanwhile, it was confirmed that as the content of oxygen in the compressed gas was increased, the titania layer was easy to be formed, and on the other hand, as the content of oxygen in the compressed gas was decreased, the titania layer was hard to be formed.

Accordingly, it was confirmed that, in a case where the particle diameter of the injection powder was increased and the possibility of the powder dust explosion was reduced, the content of oxygen contained in the injection fluid was increased, and on the contrary, in a case where an oxidative reaction easily occurred and the injection powder having a small particle diameter which allowed easy photocatalyst coating was used, and thereby even reduced content of oxygen in the injection fluid was used so as to decrease the possibility of powder dust explosion, the process capability did not deteriorate remarkably.

(3) Test Example 3

[Confirmation Test of Catalyst Effect of Photocatalyst Coating Products]

As described above, titanium balls with photocatalyst coating by the methods of the embodiments 6 to 9 were put in the tap water as a catalyst, and ORP change in the tap water was measured, the results of which are shown in Table 5 below.

The test method was as follows. Each catalyst of 10 g was put in the tap water of 100 cc, and the ORP of each tap water was measured every 10 minutes keeping them under the same condition (in the room; under irradiation of sunlight (daytime)).

Note that in the comparative examples:
"comparative example 4" denotes the tap water to which a titanium ball is added, the titanium ball being processed in the same processing condition as in the embodiment 8 except a point of using air (the oxygen amount of 21 %) as the compressed gas;
"tourmaline" denotes the tap water to which tourmaline having a particle diameter of 2 to 4 mm is added; and
"untreated" denotes the tap water to which nothing is added.

Note that ORP is an abridged form of Oxidation Reduction Potential, and decrease of ORP value indicates that the tap water was reduced.

TABLE 5

| Elapse Time (minute) | Change of ORP (mv) | | | | Comparative Example | | |
|---|---|---|---|---|---|---|---|
| | Embodiment | | | | Compara-tive 4 | Tourma-line | Un-treated |
| | 7 | 9 | 8 | 6 | | | |
| 0 | 726 | 723 | 759 | 713 | 746 | 770 | 720 |
| 10 | 743 | 734 | 712 | 663 | 693 | 560 | 763 |
| 20 | 743 | 732 | 689 | 610 | 656 | 533 | 768 |
| 30 | 737 | 728 | 663 | 574 | 645 | 513 | 772 |
| 40 | 730 | 720 | 633 | 524 | 629 | 504 | 773 |
| 50 | 710 | 709 | 605 | 491 | 596 | 501 | 773 |
| 60 | 705 | 697 | 582 | 477 | 574 | 498 | 773 |
| 70 | 698 | 683 | 567 | 469 | 551 | 497 | 772 |
| 80 | 674 | 646 | 557 | 462 | 530 | 496 | 770 |
| 90 | 656 | 623 | 519 | 457 | 503 | 496 | 768 |
| 100 | 636 | 596 | 524 | 452 | 480 | 496 | 766 |
| 110 | 614 | 567 | 523 | 447 | 460 | 496 | 764 |
| 120 | 593 | 541 | 520 | 443 | 443 | 496 | 761 |

From the results, in the tap water where a photocatalyst coating product on which a titania layer was formed by a method of the present invention was put, the ORP is reduced with time elapse, and in the ORP after 120 minutes, with regard to the embodiment 6, the ORP is lowered to the equivalent level or lower than that of the tourmaline, which is known as a generation source of minus ion, and also is by no means inferior to the catalyst of the comparative example 4 obtained by injecting the compressed air (the content of oxygen approximately 21%) in comparison therewith.

From this result, it was confirmed that a photocatalyst coating product coated by a photocatalyst coating method of the present application achieved a good reduction performance.

The invention claimed is:

1. A photocatalyst coating method, comprising the steps of injecting titanium or a titanium alloy powder having an average particle diameter range of 10 to 800 μm on a surface of a product to be treated composed of metallic product, ceramic, or mixture thereof, with compressed gas having inert gas as the principal component containing oxygen in a range from 0 to 15% by mass, wherein the content of oxygen in said compressed gas is reduced or increased within said range where the particle diameter of the powder of said titanium or titanium alloy to be injected is reduced or increased, respectively, within said average particle diameter range and diffusing and oxidizing powder of the titanium or the titanium alloy on the surface of said product to be treated so as to form a photocatalytic titania layer.

2. The photocatalyst coating method according to claim 1, wherein, an injection of the powder formed of said titanium or titanium alloy is performed at an injection speed of 80 m/sec or more or at an injection pressure of 0.29 MPa or more.

3. The photocatalyst coating method according to claim 1, wherein in case the powder formed of said titanium or titanium alloy has an average particle diameter of 20 to 45 μm, the content of oxygen in said compressed gas is in the range of 0 to 10% by mass, preferably 5% by mass.

4. A photocatalyst coating method according to claim 1, wherein in case the powder formed of said titanium or titanium alloy has an average particle diameter of 300 μm to 800 μm, the content of oxygen in said compressed gas is in the range of 10 to 15% by mass.

5. The photocatalyst coating method according to claim 3, wherein in case the powder formed of said titanium or titanium alloy has an average particle diameter of 300 μm to 800 μm, the content of oxygen in said compressed gas is in the range of 10 to 15% by mass.

6. The photocatalyst coating method according to claim 2, wherein in case the powder formed of said titanium or titanium alloy has an average particle diameter of 300 μm to 800 μm, the content of oxygen in said compressed gas is in the range of 10 to 15% by mass.

7. The photocatalyst coating method according to claim 2, wherein in case the powder formed of said titanium or titanium alloy has an average particle diameter of 20 to 45 μm, the content of oxygen in said compressed gas is in the range of 0 to 10% by mass, preferably 5% by mass.

* * * * *